Aug. 23, 1932.  R. D. SMITH  1,872,838
INDICATING DEVICE
Filed April 30, 1932
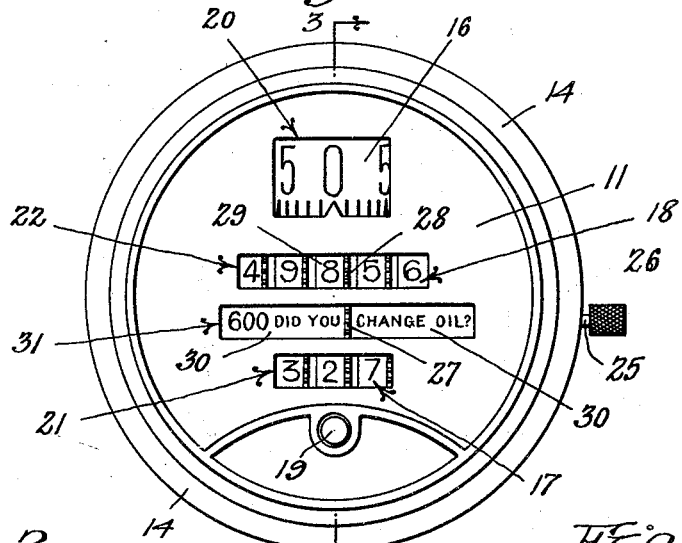
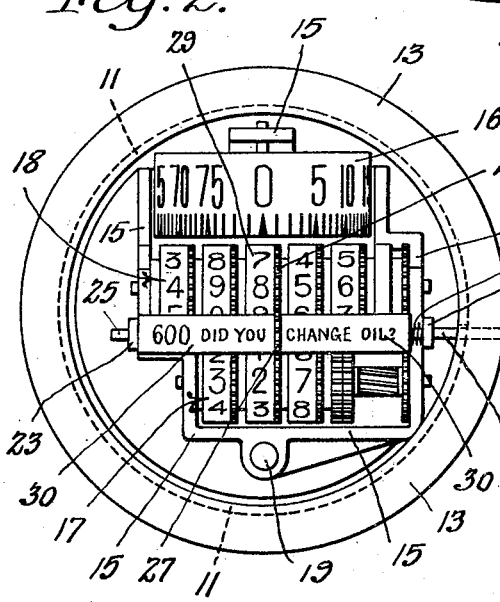
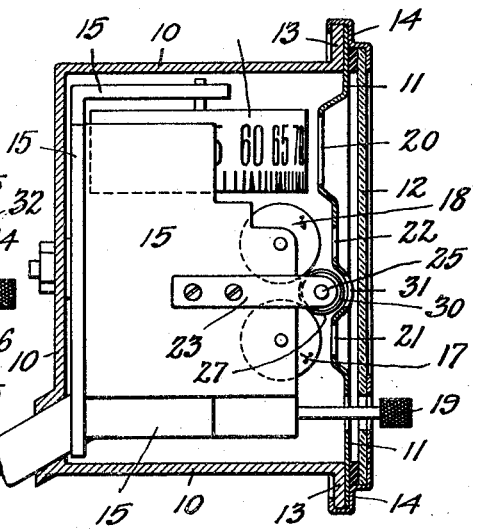
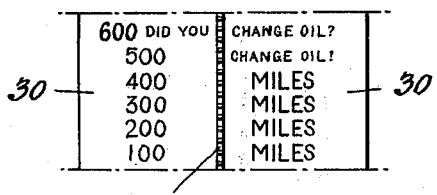
Inventor
Roy D. Smith
By H. F. Woodward
Attorney Patented Aug. 23, 1932

1,872,838

UNITED STATES PATENT OFFICE

ROY D. SMITH, OF WESSON, MISSISSIPPI

INDICATING DEVICE

Application filed April 30, 1932. Serial No. 608,515.

This invention relates to indicating devices for motor vehicles and has especial reference to such as are operated and controlled by the travel of the vehicle and indicate the distance of such travel.

In the operation of a motor vehicle it is necessary that the oil supply system of the motor be drained of the old oil and a supply of fresh oil be provided at certain intervals. For most efficient and economic operation of the motor it is highly desirable that this replacement of oil be made at regular and predetermined intervals after the vehicle has travelled a given distance. The usual practice, among motor vehicle operators, is to make a memorandum of the "speedometer" mileage reading when they renew the oil supply and trust to luck that such memorandum will be preserved and serve as a reminder when the oil supply should be changed. These memoranda are frequently made upon backs of handy envelopes and sometimes upon paper "stickers" which are affixed to the glass of the wind-shield or upon the face of the rear vision mirror. Such make-shifts are, in the one case, careless, and in the other case, unsightly, and in both cases are always subject to casual loss with consequent defeat of their purpose.

With these facts in mind the primary and most important object of the present invention is to provide a permanent indicator which will visibly indicate such intervals of travel as have been predetermined as proper for a draining and renewal of the motor oil supply.

Another important object of the invention is to provide an indicator of the nature specified which will operate in connection with the established form of speed indicator and mileage recorder known as a "speedometer" and with which all motor vehicles are as a matter of course provided.

A further important object of the invention is to provide an indicator of the nature specified which is so constructed that it may be made as an original part of a speedometer or readily applied to one already in use without disturbance of any of the existing parts.

Still another important object of the invention is the provision of an indicator as set forth so constructed and mounted that it may be "re-set" or restored to zero position without disturbance of any of the speedometer parts or any corresponding re-setting thereof.

With these and other objects in view, the invention further consists in the combination of elements and arrangement of parts such as illustrated in the accompanying one sheet of drawing; herein fully described; and hereinafter specifically claimed.

In the drawing, wherein like characters of reference are used to indicate identical parts in the several views, Figure 1 is a face view of a speedometer of standard type to which this invention has been applied.

Figure 2 is a similar view but with the face cover and dial removed to illustrate the internal mechanism.

Figure 3 is a transverse vertical sectional view on the line 3—3, Figure 1, but showing the internal mechanism and its supporting framework in side elevation, and Figure 4 is a face view, in flat projection, of certain indicator rollers forming an important part of this invention.

Referring to the drawing, there is illustrated a speedometer comprising a case or housing 10 closed at its back but open at its front and having its open front adapted to be closed by means of a dial 11 and a transparent cover 12 both held in place against an outwardly turned flange 13 at the open edge of the housing 10 by means of a removable clamp ring 14.

Contained within the housing 10, and adapted to be operated in the customary manner from a wheel of the vehicle, is mechanism including a framework 15 upon which is mounted, in the usual way, a rotatable annular element 16 designed to indicate the speed at which the vehicle is travelling; a train 17 of three disks, each bearing numerals 0 to 9 upon its face, and the three being operatively connected by ten-to-one gearing in the customary way; and a train 18 of five similar disks bearing similar numerals upon their faces and being similarly connected.

The train 17 of three disks is that provided to indicate "trip mileage" and may be re-set to its zero position at any desired time by means of the usual re-setting knob 19 without any effect upon the train 18 of five disks which is that provided to indicate "total mileage" of the vehicle and which has no re-setting means.

In the dial 11 are apertures 20, 21, and 22 designed, respectively, to afford unobstructed views of the "speed," "trip mileage," and "total mileage" indicators.

The structure as thus far described is all old and of the character well known in the art. Consequently, and as it forms no special part of the present invention, no special illustration is attempted of the operative means provided to and between the various elements shown, as such means are of the customary nature and their detailed showing, while serving no useful purpose, would tend to confuse the showing of the parts of the structure which constitute the subject matter of the present invention. These parts will now, in detail, be described.

Projecting forwardly from the side members of the main framework 15, and either removable therefrom or integral therewith, are supplementary side frames 23 and 24 in the respective outer ends of which are provided bearings for a transverse shaft 25 one end of which preferably projects through an opening in the side wall of the housing 10 and terminates, therebeyond, in an operating knob 26. Mounted upon this shaft 25, at a point intermediate its ends, is a spur pinion 27 so positioned, laterally, as to intermesh with a spur gear 28 upon that disk 29 which is the central one of the five which constitute the "total mileage" indicating train 18 and which is the one which serves to indicate the "hundreds" of miles of travel of the vehicle.

In the present instance the gearing 27—28 is so designed as to produce one full rotation of the shaft 25 with each six point forward feed of the ten point disk 29. In other words, the shaft 25 will make one full rotation with each six hundred miles of travel of the vehicle.

Fixedly mounted upon the shaft 25 at the sides of the pinion 27 are rollers 30 upon the faces of which appear indicia such as will best serve to show the amount of travel of the vehicle since the last renewal of motor oil and serve as a preemptory warning that the time has come to again renew the supply. It is assumed, of course, that this indicia was set at its zero position at the time fresh oil was last supplied.

A supplementary aperture 31 is formed in the dial 11 in such position as to afford unobstructed view of the faces of the rollers 30.

The methodical and careful motor vehicle operator will heed the warning displayed and will promptly renew the oil supply, but, with human nature as it is and methodical and careful motor vehicle operators being in a minority, it is deemed desirable to provide means whereby the indicia may be re-set at its zero position at any time. This is readily and preferably accomplished by having the pinion 27 loosely mounted upon the shaft 25 but frictionally gripped between the inner ends of the fixedly mounted rollers 30. This frictional grip is sufficiently tight that the shaft 25 with its rollers 30 will readily rotate with, and under the urge of, the pinion 27, but the shaft 25 with its rollers 30 may be manually rotated by means of the knob 26, without corresponding rotation of the pinion 27. In this case, the pinion 27 is held fast by its engagement with the gear 28 upon the disk 29 and slips in respect to the shaft 25 and between the ends of the rollers 30. Mounted on the shaft 25 and between the frame 24 and the roller 30 is spring 32 which by exerting pressure against roller 30 holds pinion 27 securely in operative engagement with gear 28.

In Figure 4 is shown, in flat projection, indicia such as may appear upon the faces of the rollers 30 wherein it is seen that warning is given, at five hundred miles, that the need of an oil change impends, and at six hundred miles, which also constitutes the zero position of the indicia medium, the warning is repeated in different terms.

It is of course, to be understood that the interval of six hundred miles has been arbitrarily selected for the purpose of illustration only, and that it does not in any way impose a limitation upon the invention. It is readily understandable that a mere change in size of parts and re-wording of the indicia medium is all that is required to adapt the invention to any desired unit of mileage.

Other equally obvious modifications and alterations in the shape, size and arrangement of parts will readily suggest themselves to those skilled in the art and, while such modifications and alterations are herein neither specifically illustrated nor described, it is to be understood that they are contemplated and reserved as forming part of this invention insofar as they fall within the scope of the appended claims.

Thus it will be seen that there has been provided a structure of the character set forth which is economical to manufacture; easy to install, either as an original part of a speedometer or as an attachment to one already in use; and which is positive and practical in its operation and efficient for the purpose intended.

It is to be understood that shaft 25 and the rollers 30 may be caused to rotate by being connected to the last disk of the train 17, which disk makes a complete revolution every 100 miles.

Having thus described the invention, I claim:—

1. An indicating device for motor vehicles including a framework, a train of operatively connected mileage indicating members rotatably mounted thereon, a spur gear secured to one of the members of said train, laterally spaced bearings on said framework, a shaft rotatably mounted in said bearings, a supplementary indicating member secured to said shaft, and a spring means upon said shaft for holding said spur gear in operative engagement with the said spur gear secured to one of said train members, and a spur pinion mounted on said shaft and intermeshing with the said spur gear on the said member of said train, said spur pinion being free to rotate upon said shaft but being frictionally engaged by said supplementary indicating member.

2. An attachment for an indicating device for motor vehicles having a framework and a train of operatively connected mileage indicating members rotatably mounted thereon, said attachment comprising a pair of laterally spaced bearings adapted to be removably secured to said framework, a shaft rotatably mounted in said bearings, an indicating member secured to said shaft, a spur gear loosely mounted upon said shaft but frictionally engaged by said indicating member thereon and in operative connection with one of the members of the train whereby rotation of said train member will cause rotation of said shaft through the medium of said indicating member thereon but will not prevent rotation of said shaft independently of said last named means, and a spring mounted on the said shaft for pressing against one of said bearings and the indicating means to hold said spur gear in operative engagement with one of said members of the train.

3. In an indicating device for a motor driven machine having a framework and a train of operatively connected mileage indicating members rotatably mounted thereon, an attachment comprising a pair of laterally spaced bearings adapted to be removably secured to said framework, a shaft rotatably mounted in said bearings, said shaft extending beyond said framework and having a handle thereon for rotating said shaft, an indicating member comprising two sections mounted upon said shaft, a spur gear loosely mounted upon said shaft and between the section of said indicating device, said spur gear frictionally engaged by said indicating member and in operative engagement with one of the members of the train whereby rotation of said train will cause rotation of said shaft but will not prevent rotation of said shaft independently of said last named means, and a coil spring mounted upon said shaft between one of said bearing members and one end of said indicating member to hold said spur gear in operative engagement with said train member.

ROY D. SMITH.